Aug. 14, 1951 — L. A. MARSHALL — 2,564,207
HEN'S NEST
Filed Nov. 23, 1948 — 2 Sheets-Sheet 2
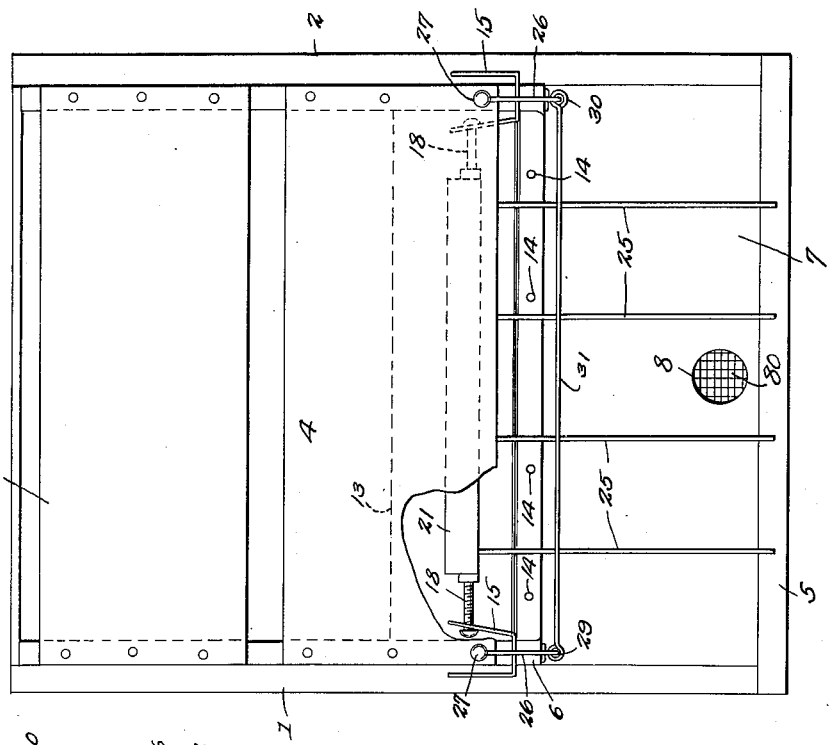
L. A. Marshall
INVENTOR
BY C. A. Snow & Co.
ATTORNEYS.

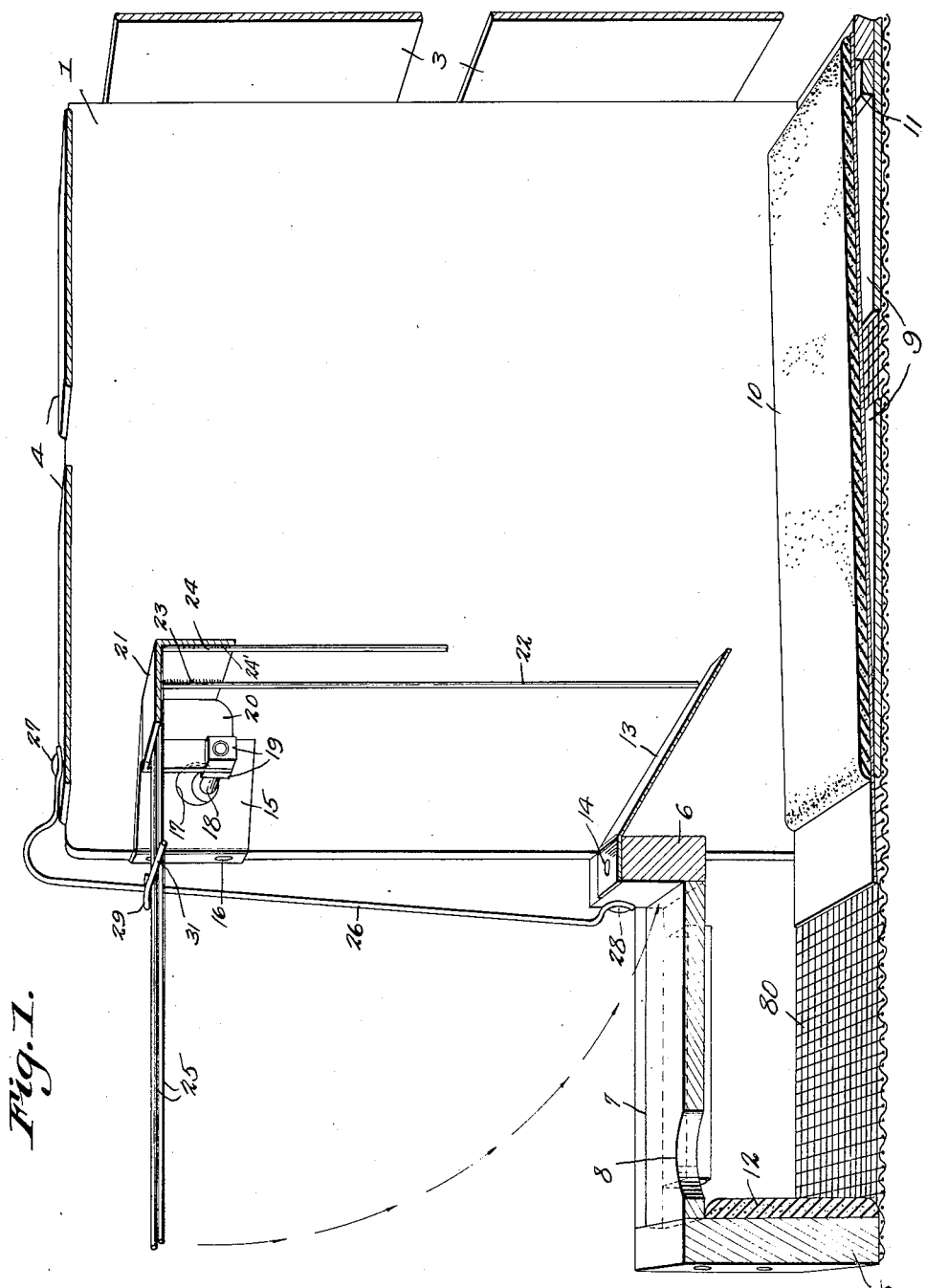

Patented Aug. 14, 1951

2,564,207

UNITED STATES PATENT OFFICE 2,564,207

HEN'S NEST

Luther A. Marshall, Floydada, Tex.

Application November 23, 1948, Serial No. 61,683

2 Claims. (Cl. 119—47)

This invention relates to an improved construction of a hen's nest.

An object of the invention is to provide an improved construction of hen's nest which will automatically prevent more than one hen from entering the nest.

Another object of the invention is to provide an improved hen's nest which will be formed with pivotally supported barrier rods operable by a hen entering the nest to prevent the entrance of another hen into the nest while occupied by the first hen.

A further object of the invention is to provide an improved hen's nest which will have means operable by a hen when entering the nest for preventing another hen to enter the nest while occupied, and means for cushioning an egg when it is laid and for automatically moving the egg to a compartment adjacent the nest where it is impossible for the hen to get to the egg to eat or break it.

A still further object of the invention is to provide an improved form and construction of trap nest for hens which will be highly efficient in operation, and relatively inexpensive to manufacture and produce.

Other objects will appear as the description proceeds.

In the accompanying drawings which form a part of this application:

Figure 1 is a perspective view of the improved hen's nest with parts thereof being removed and parts shown in section.

Fig. 2 is a front end elevation of the improved hen's nest.

Fig. 3 is a plan view of the improved hen's nest with parts thereof being broken away to show the underlying portions.

Fig. 4 is an enlarged detail sectional view of the barrier supporting mechanism when a second nest is placed adjacent the first nest.

Like characters of reference are used throughout the following specification and the accompanying drawings to designate corresponding parts.

In carrying out the invention, there is shown and provided an improved form and construction of hen's nest comprising a substantially rectangular shaped compartment or housing having spaced vertically extending side walls 1 and 2, rear closure slots 3, top closure slots 4, and a forwardly extending egg receiving compartment formed by the sills 5 and 6 between which the threshold board 7 is disposed. An aperture 8 is formed through the board 7 and serves the purpose of a peep opening to see if there are any eggs in the egg receiving compartment, and providing a finger opening when removing the threshold board 7 for collecting eggs from the egg receiving compartment.

A substantial wire mesh floor 80 is provided to close the bottom of the nest compartment or housing, the same being reinforced by the cross extending strips 9.

A soft rubber cushioning strip 10 is disposed in the bottom of the nest compartment or housing, the inner end thereof being elevated by means of the strip 11, whereby eggs when laid will be cushioned and will roll forwardly from the nest compartment or housing into the egg receiving compartment. A vertically disposed soft rubber cushioning strip 12 will be attached to the inner surface of the sill 5 for cushioning the eggs as they roll from the nest compartment into the egg receiving compartment.

A downwardly inclined resilient movable metal sill plate 13 is secured by the fasteners 14 to the upper end of the sill 6 and extends into the next compartment.

U-shape spring supporting clips 15 are secured by the fasteners 16 to the forward edges of the side walls 1 and 2 adjacent their upper ends, and are apertured as at 17 to receive and pivotally support the laterally adjustable screws 18 whose inner ends extend through the nuts 19 supported by the ends 20 disposed at the ends of the angle iron closure actuating plate 21 extending transversely of the nest opening.

A series of transversely spaced barrier rods 22 are secured at 23 to one side of the angle iron plate 21 with their lower ends engaging the upper surface of the resiliently tensioned movable metal sill plate 13 when the nest is not occupied by a hen. A centrally disposed barrier rod 34 of shorter length is secured at 24' to the angle iron plate 21 and extends between the barrier rods 22 with its lower end spaced somewhat above the sill plate 13.

A second series of transversely extending barrier rods 23 are secured to the other side of the angle iron plate 21 and extend forwardly at right angles to the barrier rods 22 when the nest is unoccupied.

Forwardly and downwardly extending guide rods 26 are attached by the fasteners 27 and 28 to the tops of the side walls 1 and 2 and to the front surface of the sill 6. The looped ends 29 and 30 of a transversely extending weight rod 31 are slidably disposed over said guide rods 26, with said weight rod 31 overlying and in contact with said barrier rods 25.

The flexibility of the spring clips 15 is sufficient to enable them to be moved while inserting or removing the screw 18 from the apertures 17, the heads of said screws being under a resilient tension.

When the eggs are laid they will immediately roll into the egg receiving compartment safe from being eaten or broken by the hen.

If the rod 31 is secured in its lowermost position the automatic trap nest may be converted into a permanent trap nest.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In a hen's nest, a body having side walls and having an open front, U-shaped spring supporting clips secured over the forward edges of the side walls portions of said supporting clips being spaced from said side walls, said clips having apertures therein, a closure embodying an angle bar disposed horizontally along the upper end of the open front, headed members extending from the ends of the angle bar, the heads of the headed members being substantially smaller than the apertures and being disposed within the apertures, pivotally connecting the angle bar within the open front of the body, a series of transversely spaced barrier rods extending from one side of the angle bar, a series of transversely spaced barrier rods extending from the angle bar and being disposed at right angles with respect to the first mentioned rods, said rods at one side of the bar adapted to move closing the open front of the hen's nest when a hen moves into engagement with the opposite rods on entering the nest, excluding entrance of a hen while the nest is occupied.

2. In a hen's nest, a body having side walls and having an open front, U-shaped spring supporting clips secured over the forward edges of the side walls, portions of said supporting clips being spaced from said side walls, said clips having apertures therein, a closure embodying an angle bar mounted at the upper end of the open front, headed members extending from the ends of the angle bar, the heads thereof being substantially smaller than the apertures and being disposed within the apertures pivotally connecting the angle bar at the open front of the body, and barrier rods extending from the bar adapted to close the open front of said body.

LUTHER A. MARSHALL.

REFERENCES CITED

The following references are of record in the file of this patent:

UNITED STATES PATENTS

| Number | Name | Date |
|---|---|---|
| 867,348 | Crosley | Oct. 1, 1907 |
| 1,081,317 | Mahony | Dec. 16, 1913 |
| 1,240,972 | Hatch | Sept. 25, 1917 |
| 1,453,172 | Olson | Apr. 24, 1923 |
| 2,113,859 | Rowe | Apr. 12, 1938 |